United States Patent Office 3,447,325
Patented June 3, 1969

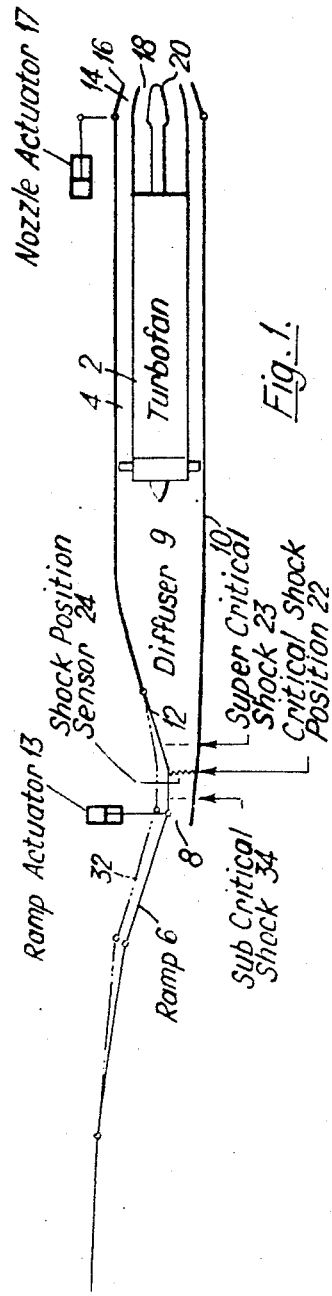
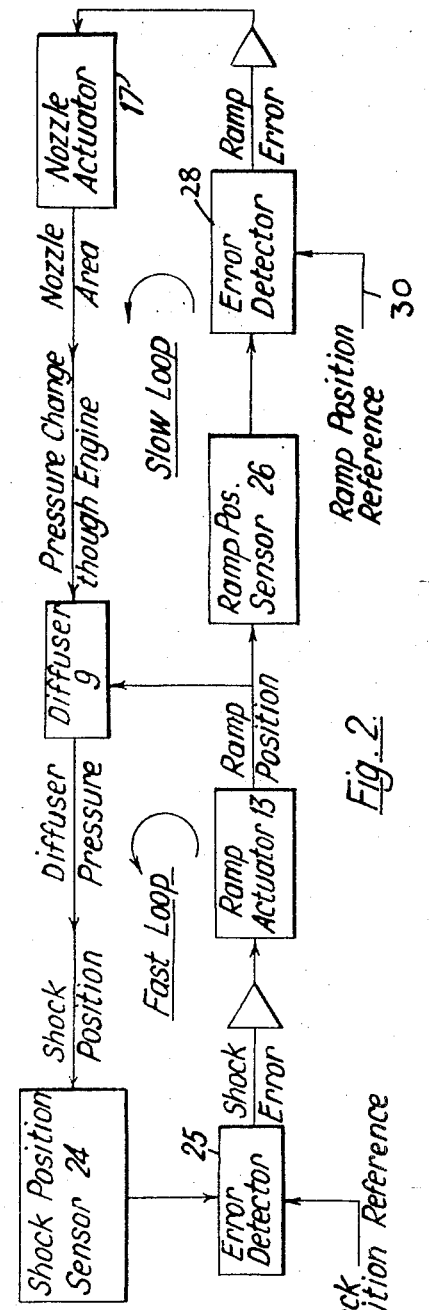

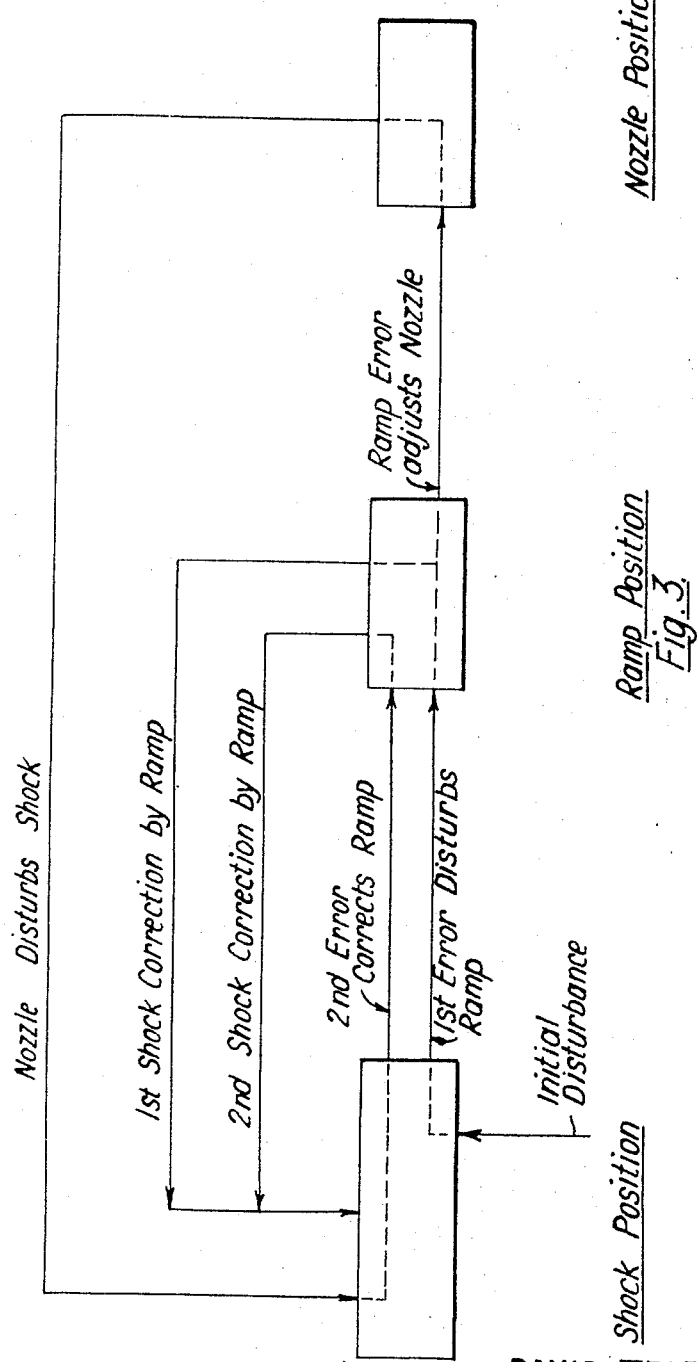

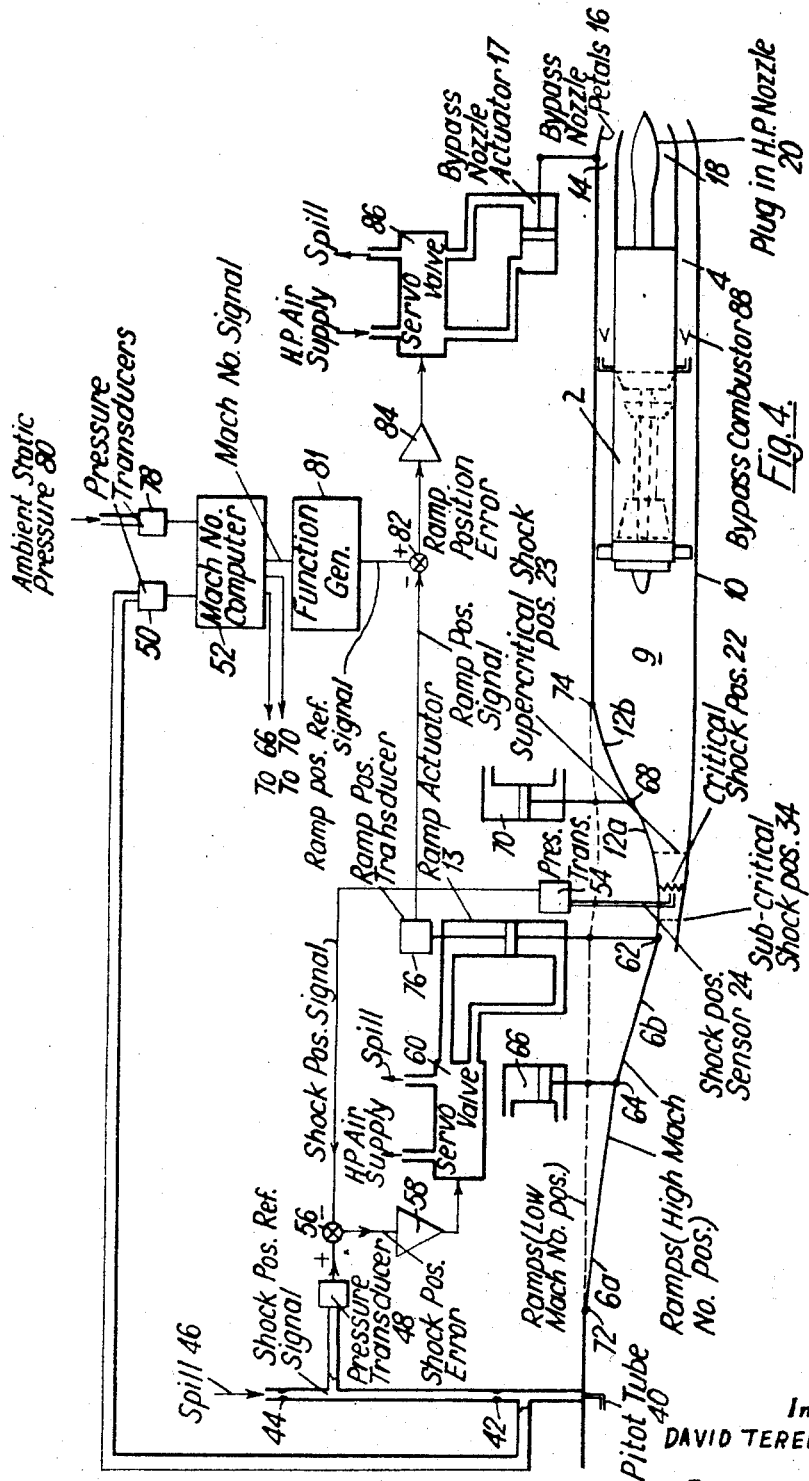

3,447,325
CONTROLLING SUPERSONIC AIR INTAKES
David Terence Tiley, London, England, assignor to Bristol Siddeley Engines Limited, London, England, a British company
Filed Aug. 14, 1967, Ser. No. 660,391
Claims priority, application Great Britain, Aug. 15, 1966, 36,397/66
Int. Cl. F02k 1/18, 1/12
U.S. Cl. 60—242
5 Claims

ABSTRACT OF THE DISCLOSURE

A jet propulsion engine has a variable-area discharge nozzle for varying the swallowing capacity of the engine and a variable-geometry supersonic air intake. The position of the terminal shock in the intake is controlled by varying the intake geometry in response to shock position error to a sufficient degree to produce an intake geometry error. This intake geometry error in turn produces such a variation in the swallowing capacity of the engine as to make a further correction of the shock position sufficient to result in an over-correction error of the shock position, which produces correction of the intake geometry.

---

This invention relates to controlling the position of the terminal shock of a supersonic air intake for a jet propulsion engine, by means of a closed loop control system. For best engine performance, the terminal shock should be maintained in a position near the throat of the intake, referred to as the "critical position," despite any environmental change, such as a change in the speed or incidence of the free stream, tending to disturb the shock position. It is known to correct the shock position by varying the pressure in the subsonic diffuser immediately downstream of the intake throat, either by means of spill doors in the diffuser walls or by varying the air mass flow capacity, also called the "swallowing capacity," of the engine supplied by the intake. The swallowing capacity of the engine can be controlled in various ways, e.g. by changing the area of the final nozzle or changing the fuel flow.

It is important for the diffuser pressure to be changed very fast, in order to establish conditions tending to return the terminal shock to its critical position before it has departed more than a small amount from that position. The spill doors give the necessary speed but can introduce drag in the diffuser to an undesirable extent. Also the presence of spill doors involves additional weight.

Means for varying the swallowing capacity of the engine do not usually have the necessary speed of response. For example, if the nozzle area is varied, the time taken for this to make itself felt in terms of diffuser pressure at the other end of the engine is too great, especially if the engine is very long. Moreover, in the case of a turbojet or turbofan engine, the rotating machinery may oppose the rapid propagation of a pressure change from the rear to the front of the engine. This is particularly true of engines with rotor systems of large diameter, e.g. bypass engines with large diameter fans.

This invention requires an intake which is of variable geometry, for example an intake having ramps capable of being moved to vary the size of the intake throat. A change in the ramp position has a virtually instantaneous effect on the shock position, but it is not desirable to use the ramp for shock control other than transiently, because adjustment of the ramp has its own main function, namely controlling the shock system upstream of the terminal shock.

According to the invention there is provided a jet propulsion power plant comprising a jet propulsion engine, means for varying the swallowing capacity of the engine, a variable geometry supersonic air intake to the engine, and a system for controlling the position of the terminal shock in the intake; the system comprising a first closed loop control means responsive to shock position error to make a correction of shock position by varying the intake geometry and in so doing to occasion an intake geometry error, and second closed loop control means responsive to said intake geometry error to vary the swallowing capacity of the engine to make a further correction of the shock position in the same sense as the first correction and thereby produce an over-correction error of the shock position, the first control means in turn responding by varying the intake geometry to correct the over-correction error, thereby removing the intake geometry error and causing the variation of the swallowing capacity to cease.

This is best explained with reference to the accompanying drawings, in which:

FIGURE 1 is a diagrammatic longitudinal vertical section of a power plant including a turbofan, i.e. a ducted fan gas turbine engine, and a supersonic air intake therefor;

FIGURE 2 is a diagram of the components of the servo loops;

FIGURE 3 is a diagram of the sequence of events in operation;

FIGURE 4 is an enlargement of FIGURE 1, showing more detail, but still diagrammatic.

Figure 5:
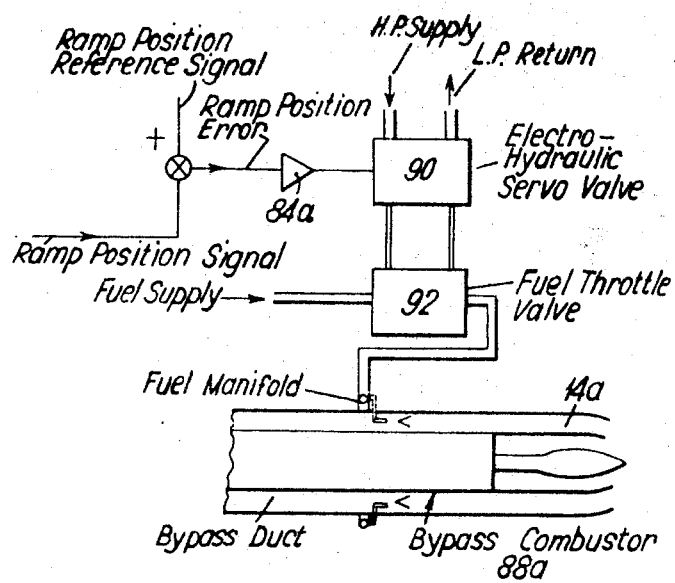
FIGURE 5 is a fragmentary diagram of a modification.

In the plant shown in FIGURES 1 and 4, the engine is a turbofan, having a central casing 2 containing a high-pressure compressor, combustor and turbines, surrounded by a by-pass duct 4 with a fan at its forward end.

The engine has a supersonic inlet including a compression ramp 6, a throat 8, and a diffuser 9, lying between a fixed lower wall 10 and a diffusion ramp 12. The ramps 6 and 12 are adjustable. In particular, the cross section of the throat 8 (using the term "throat" to mean the plane of minimum cross section of the intake), is controlled by an actuator 13.

The by-pass duct discharges through a nozzle 14, the area of which can be varied by external "petals" 16 controlled by an actuator 17. The turbines discharge through a central nozzle 18, the area of which can be varied by an axially-adjustable plug 20.

In use, a terminal shock occurs in the entrance to the diffuser. The engine is designed to operate with the shock in a "critical" position 22. Stable operation depends on this position being in a portion of the intake that is silghtly divergent rearwards; thus the position 22 must be somewhat downstream of the throat 8.

Briefly, as indicated in FIGURE 3, a disturbance of the shock position produces a first shock error, which is used to disturb the ramp position, with consequent change in inlet diffuser pressure and correction of shock position. The disturbance of the ramp position causes a ramp position error which is used to cause progressive adjustment of the nozzle. This, with some time lag, changes the diffuser pressure further, so as to cause an over-correction shock error in a sense opposite to that of the first shock error. The ramps will immediately respond to correct this new shock error and in doing so the ramps move progressively into their original position, and the whole system settles down to leave the nozzle as the only changed component.

For example, referring to FIGURES 1 and 2, suppose an initial disturbance causes the shock to move downstream from the critical position 22 into a supercritical position 23. This move is detected by a shock position sensor 24 consisting of a rearwardly-facing pitot tube lying in rear of the throat. The pressure change sensed by the pitot tube is fed to an error detector 25 which is also fed with a reference pressure, being the pressure which would be present at the pitot tube if the shock were still in the critical position. The difference between the pressures constitutes a shock error signal indicative of the downstream movement of the shock. This causes an operating signal to be supplied to the ramp actuator 13, and, with minimal time lag, the ramps are shifted upwards so as to decrease the ramp angle. This causes less deflection of the stream lines and consequently more air is captured by the intake. This leads rapidly to a rise in pressure in the diffuser 9, and a shifting of the shock back towards the critical position. The action rapidly attains a situation in which the shock is restored to the critical position and the ramps 6, 12 are at rest in a position displaced from their original position.

The position of the ramps actuates a sensor 26 which provides one of two signals fed into a ramp error detector 28. The other signal is a ramp position reference signal 30 derived from a measurement of flight Mach number. To any given value of the reference signal there corresponds a datum position of the ramps, and departure of the ramps from that datum gives rise in the ramp position sensor 26 to a ramp error signal which causes an operating signal to be supplied to the nozzle actuator 17.

In the example under consideration, the ramps, starting in their datum position, have moved upwards, as indicated at 32 in FIGURE 1, to produce an increase in diffuser pressure. To maintain this increase, while allowing the ramps to revert to their datum position, the ramp error signal is arranged to cause the nozzle 16 to progressively close. This closing takes place more slowly than the ramp movement, and its effect on diffuser pressure involves a time lag.

However, the effect of the progressive closing of the nozzle is to decrease the swallowing capacity of the engine. As the diffuser pressure in consequence rises further, the shock becomes over-corrected and tends to shift forwards into subcritical positions such as 34. This is detected by the shock position sensor 24, which causes an appropriate signal to the ramp actuator 13, so that the ramps are progressively shifted downwards at a rate which restrains the rise in diffuser pressure and thus restrains the forward shift of the shock. At the same time, the shifting of the ramps downwards brings the ramps back to their datum position and this in turn brings the ramp position sensor 26 back to datum position and so causes the closing of the nozzle to cease.

The whole system thus attains a new stable condition in which, as a result of the initial disturbance, the nozzle has a reduced throat area, the diffuser pressure is increased, the ramps are back in their datum position and the terminal shock is back in the critical position 22.

Additional details of construction are shown in FIGURE 4. This figure is still diagrammatic, in that the internal construction of the various transducers, amplifiers and valves and of the Mach number computer and function generator are not shown, because these are components which are already available individually, and their internal construction is no part of the present invention.

A reference pressure is obtained by a pitot tube 40, arranged in the free air stream, or in the field of the wing of the aircraft. This pitot tube is connected to a pressure potentiometer including two restrictions 42 and 44 leading to a spill discharge 46. The pressure between the restrictions is used as a shock position reference signal, and is fed to a pressure transducer 48. The pressure from the pitot tube 40 is also conveyed directly to a pressure transducer 50 connected to a Mach number computer 52, referred to further below.

The shock position sensor 24 is a rearward facing pitot tube in the entry of the diffuser. This is connected to a pressure transducer 54. Electric signals from the transducers 48 and 54 are subtracted at 56 to give a shock position error signal which is then passed through an amplifier 58 and used to control an electro-pneumatic servo valve 60. This valve 60 controls supply and exhaust of high pressure air to the pneumatic ramp actuator 13.

The compression ramp is in two portions 6a and 6b and the diffuser ramp is in two portions 12a and 12b. The ramp portions are shown in solid lines in positions suitable for high Mach numbers, and in broken lines in positions suitable for low Mach numbers. The portions 6b and 12a are connected together by a pivot 62 which lies at the throat of the intake. The ramp actuator 13 is connected to this pivot 62.

The portions 6a and 6b are connected together by a pivot 64, which is also connected to a further actuator 66. The portions 12a and 12b are connected together by a pivot 68, which is also connected to a further actuator 70. These actuators 66 and 70 are connected by means, not shown in detail, to the Mach number computer 52. The portions 6a and 12b are connected to the fixed structure of the intake by sliding pivots 72 and 74. Upon a change in Mach number, all three actuators 13, 66 and 70 operate in conjunction to vary the geometry of the intake as desirable.

The piston of the ramp actuator 13 is coupled to a transducer 76 which has an output constituting an electric ramp position signal. The Mach number computer 52 is connected not only to the pitot tube 40, but also, via a transducer 78, to an ambient static pressure intake 80. The output from the Mach number computer is fed to a function generator 81 which is set to operate in accordance with the known design of the intake. The output of this function generator is a signal representative of the ramp position which is appropriate to the Mach number at any instant. This ramp position reference signal, and the output from the transducer 76, are subtracted at 82, to give a ramp position error signal which is fed through an amplifier 84 to an electro-pneumatic servo valve 86. This valve 86 controls the supply and exhaust of high pressure air to the nozzle actuator 17, which is connected to the petals of the by-pass nozzle 16. It may be said therefore that, in acting on the nozzle 16, the ramp position error signal selects that nozzle area which, for a given Mach number (and engine speed), produces the correct shock and ramp positions. The plug 20 is operated independently of the shock control according to the present invention. It may be controlled, by means not shown, in conjuction with means controlling fuel supply to the engine combustor, as a means of varying engine thrust at constant air mass flow.

As alternatives to the arrangement shown, the engine may be a turbofan with a nozzle common to the fan duct and the exhaust of the engine, or, where there are separate nozzles for the fan duct and the engine exhaust, the latter nozzle, or both nozzles, can be used for the shock control system. Alternatively the engine may be a turbojet without a fan.

If, instead of a variable nozzle, variable fuel flow is used in the slow loop of the control system, it may be the fuel flow to the engine or to a fan duct (if duct burning is used) which is made the variable in the slow loop.

FIGURE 5 shows such an arrangement. Here the by-pass nozzle 14a has no adjustment, but the by-pass combustor 88a is linked into the shock position control system. The means for generating a ramp position error signal, and feeding it to the amplifier 84a, is the same as in FIGURE 4, but the output from the amplifier 84a is fed to an electro-hydraulic servo valve 90, which controls a throttle valve 92 in the supply of fuel to the by-pass combustor 88a.

I claim:

1. A jet propulsion power plant comprising a jet propulsion engine, means for varying the swallowing capacity of the engine, a variable-geometry supersonic air intake to the engine, and a system for controlling the position of the terminal shock in the intake; the system comprising first closed loop control means responsive to shock position error to make a correction of shock position by varying the intake geometry and in so doing to occasion an intake geometry error, and second closed loop control means responsive to said intake geometry error to vary the swallowing capacity of the engine to make a further correction of the shock position in the same sense as the first correction and thereby produce an over-correction error of the shock position, the first control means in turn responding by varying the intake geometry to correct the over-correction error, thereby removing the intake geometry error and causing the variation of the swallowing capacity to cease.

2. A power plant according to claim 1, in which the intake includes a movable compression ramp, and a movable diffuser ramp, connected together at the intake throat, and an actuator for shifting the connection to vary the throat cross section as the means of correcting shock position.

3. A power plant according to claim 2 including means responsive to Mach number and means arranged to produce a first signal representative of ramp position appropriate to the instant value of Mach number, means for deriving a ramp position error signal from said first signal and from a transducer connected to the ramp actuator, and means responsive to said error signal to vary the swallowing capacity of the engine.

4. A power plant according to claim 1, in which the means for varying the swallowing capacity of the engine is a variable-area discharge nozzle on the engine.

5. A method of controlling the position of the terminal shock in a variable-geometry supersonic air intake to a jet propulsion engine, comprising: sensing a shock position error, correcting the shock position via first closed loop control means by varying the intake geometry and in so doing occasioning an intake geometry error, sensing the intake geometry error, correcting the intake geometry error via second closed loop control means by varying the swallowing capacity of the engine to make a further correction of the shock position in the same sense as the first correction and thereby produce an over-correction error of the shock position, the first control means in turn responding by varying the intake geometry to correct the over-correction error, thereby removing the intake geometry error and causing the variation of the swallowing capacity to cease.

References Cited

UNITED STATES PATENTS

| | | | |
|---|---|---|---|
| 2,955,414 | 10/1960 | Hausmann | 60—242 X |
| 3,094,072 | 6/1963 | Parilla | 60—242 X |
| 3,273,338 | 9/1966 | Rimmer | 60—235 |

FREDERICK KETTERER, *Primary Examiner.*

U.S. Cl. X.R.

60—235; 137—15.2